Patented July 9, 1940

2,207,429

UNITED STATES PATENT OFFICE 2,207,429

OIL PAINT

Frank L. Bullard, Highland Park, Mich., assignor to Stephen Wojnowski, Highland Park, Mich.

No Drawing. Application October 28, 1939, Serial No. 301,686

2 Claims. (Cl. 134—46)

My invention contemplates either the use of paints already prepared commercially and readily available in stores or paints which can be made up as needed of component elements which are ordinarily used to make paints, but makes it possible by use of some new ingredients to render such paints in some respects superior and much more economical. This last phase is due to the fact that one of said ingredients is common water which can be made to mix with oil paints in a manner which will be set out.

Ordinary paints, of the kind which are used for painting the exterior of buildings, window frames, roofs, and other such purposes, consist of a pigment mixed with an oil vehicle. Pigments are ordinarily made of some solid substance ground to a fine powder. As an example of such pigments may be cited white lead, which is a mixture of carbonate and hydroxide of lead, or zinc white which is an oxide of zinc. The nature of the pigment, of course, depends upon the color desired. Ordinarily, such pigments are mixed with some substances which act as a good binder and which on drying have the property of sticking to the surface over which they are coated. It is because certain oils, particularly linseed oil, contain some of the properties which are desirable that said linseed oil is most frequently used as a vehicle of pigments. When drying, said linseed oil has the tendency to combine with oxygen and is converted into an elastic, leathery substance which sticks to the surface to which the paint is applied.

As a rule, paints contain also certain solvents which are necessary to render the paint more fluid. It is this particular ingredient, that is a solvent, which is responsibe for the appearance of the painted surface when finished. If the paint is liquid enough when applied, it will flow from the brush without leaving any brush marks, or the brush marks, when made, will flow out and disappear, leaving the surface smooth and even. As a rule, to render the paint fluid, turpentine is used for that purpose. Turpentine has the quality of drying slowly, some time after the brush marks have evened up. Other solvents such as benzine or kerosene are also used in paints even though these solvents are not entirely satisfactory.

This only describes the commercial paints which are ready for use. These paints, however, can be applied only to a dry surface and, therefore, in practice, when painting had to be done, work was very often delayed because the surface to be painted may have been damp or wet as, for instance, after rain. Sometimes commercial paints show a tendency of cracking and peeling, particularly if the solvent in the paint is not of the best quality. In order, therefore, to overcome these drawbacks and to make the paint more economical by having the same quantity of paint serve to cover a much larger surface, I have devised a way of thinning out said commercial paint by addition thereto of a considerable quantity of water but without in any way affecting the serviceable quality of said paint. I must say that ordinarily water cannot be mixed with oil paints. I have found, however, that this difficulty may be overcome by addition to the quantity of water, which is to be mixed with oil paint, of a comparatively small quantity of what is known as lime water. Lime water, as the term is understood, is an aqueous solution of calcium hydroxide. It is a liquid which is readily available and which can be obtained in any drug store or which can be easily and cheaply made from lime or calcium oxide (CaO).

In preparing my paint, I have found that I can mix a quantity of commercially available paint with an equal amount of water, by adding to the mixture a proportionately very small quantity of lime water. The mixing is being done at the normal temperature, under normal conditions, requiring only mechanical agitation in mixing. Specifically, in preparing a gallon of paint, I am using 2 quarts of ordinary commercially available paint with an oil vehicle; 2 quarts of water, and 2 tablespoonfuls of lime water. The ingredients mix readily and result in a mixture of uniform thickness which may be applied as readily as an ordinary paint but which has certain advantages.

It appears that my paint may be applied to surfaces even when they are wet. It appears further that this paint flows easily and leaves no brush marks; it dries at moderate speed, and on drying forms a coating which is tough, durable and which does not crack or peel. In my experiments, I have painted surfaces on the same job with commercial paint as it is ordinarily used and with my mixture of said paint, and I have found out that after the lapse of some months my paint remained smooth and even, while the commercial paint showed cracks and blisters. I have further found in my experiments that the proportion of water, paint and lime water may be changed within certain bounds without much affecting the resulting appearance of the paint as applied to some surface. Care must be taken, however, not to add too much water, for contrary to what might be expected, the paint grows thicker the more water is added to it. In such a case, it may be necessary to add some more oil to make the paint thinner.

I have found also that if the work is to be smooth, it is desirable to use lesser proportions of water. A serviceable and preferred formula includes 1 quart of water to 2 quarts of paint, with 2 tablespoonfuls of lime water. The proportions of the ingredients, that is, paint, water and lime water, are really not critical and they may be varied according to needs and preference.

I believe that this is a new and useful improvement, but that certain changes may be introduced in the proportions of the ingredients without departing from the underlying idea disclosed above by me. What I, therefore, claim is as follows:

1. A composition including a paint with a drying oil base, a quantity of water substantially equal to the volume of paint, and a quantity of lime water approximately equal to one-sixtieth part of the volume of said paint.

2. A composition consisting of substantially one part of oil paint, from one-half to one part of water, and one-sixtieth part of the volume of the oil paint of lime water.

FRANK L. BULLARD.